US010661429B2

(12) United States Patent
Chen

(10) Patent No.: US 10,661,429 B2
(45) Date of Patent: May 26, 2020

(54) PNEUMATIC TOOL WITH ADJUSTABLE EXHAUST DIRECTION

(71) Applicant: BASSO INDUSTRY CORP., Taichung (TW)

(72) Inventor: Mark Chen, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 376 days.

(21) Appl. No.: 15/485,227

(22) Filed: Apr. 12, 2017

(65) Prior Publication Data

US 2017/0291291 A1 Oct. 12, 2017

(30) Foreign Application Priority Data

Apr. 12, 2016 (TW) .............................. 105111339 A

(51) Int. Cl.
*B25F 5/02* (2006.01)
*B23B 45/00* (2006.01)
(Continued)

(52) U.S. Cl.
CPC ............ *B25F 5/021* (2013.01); *B23B 45/001* (2013.01); *B24B 55/10* (2013.01); *B25D 9/08* (2013.01); *B25F 5/02* (2013.01); *B25D 17/00* (2013.01)

(58) Field of Classification Search
None
See application file for complete search history.

(56) References Cited

U.S. PATENT DOCUMENTS 1,251,121 A * 12/1917 Sherwood ............... E21B 21/01
173/69
1,371,721 A * 3/1921 Bayles .................... E21B 21/16
251/352
(Continued)

FOREIGN PATENT DOCUMENTS

CN 205734767 U 11/2016
TW 257125 U 9/1995
(Continued)

OTHER PUBLICATIONS

Machine Translation of TW M513096, inventor: Xiao, Publication date Dec. 2015, (Year: 2015).*
(Continued)

*Primary Examiner* — Chelsea E Stinson
*Assistant Examiner* — Thomas M Wittenschlaeger
(74) *Attorney, Agent, or Firm* — Chun-Ming Shih; HDLS IPR Services

(57) ABSTRACT

A pneumatic tool with changeable exhaust direction includes a tool main body and a direction change assembly. The tool main body includes a housing portion having a first exhaust channel. The direction change assembly includes an air guidance member and an adjustment member. The air guidance member is mounted onto the housing portion, and a second exhaust channel is formed with the air guidance member. The adjustment member is installed with a sealing ring. The adjustment member generates an axial movement relative to the air guidance member and along a first axis to move away from the air guidance member in order to open the second exhaust channel or to allow the sealing member to abut against the air guidance member in order to close the second exhaust channel. Accordingly, the exhaust direction is adjustable during the use of the pneumatic tool in order to facilitate different processing operations.

12 Claims, 14 Drawing Sheets

(51) Int. Cl.
*B24B 55/10* (2006.01)
*B25D 9/08* (2006.01)
*B25D 17/00* (2006.01)

(56) References Cited

U.S. PATENT DOCUMENTS

| | | | | |
|---|---|---|---|---|
| 5,591,070 | A * | 1/1997 | Kachich | B24B 23/026 |
| | | | | 173/169 |
| 8,333,253 | B2 * | 12/2012 | Radif | B25C 1/047 |
| | | | | 173/168 |
| 8,540,034 | B2 * | 9/2013 | Poncet | B25D 9/04 |
| | | | | 173/114 |
| 9,126,322 | B2 * | 9/2015 | Yaschur | B25F 5/02 |
| 2006/0225905 | A1 * | 10/2006 | Elmvist | B25C 1/047 |
| | | | | 173/197 |

FOREIGN PATENT DOCUMENTS

| | | | |
|---|---|---|---|
| TW | M320463 U | 10/2007 | |
| TW | I331954 B | 10/2010 | |
| TW | M513096 | * 12/2015 | ............ B25D 17/00 |

OTHER PUBLICATIONS

Office Action dated Oct. 24, 2019 of the corresponding Taiwan patent application.

* cited by examiner

PNEUMATIC TOOL WITH ADJUSTABLE EXHAUST DIRECTION

BACKGROUND OF THE INVENTION

Field of the Invention

The present invention is related to a pneumatic tool, in particular, to a pneumatic tool capable of utilizing simple adjustment of exhaust directions during the use of the pneumatic tool in order to facilitate different processing operations.

Description of Related Art

The structure of a known pneumatic tool includes the components of cylinder, piston and valve seat etc. installed on the main body of the tool. During the use of such tool, different accessories can be attached to the front end of the cylinder such that once the tool is activated, it can perform operations of cutting and drilling etc. However, since cutting operations can cause scattering of debris generated and drilling operations can cause spreading of flying dust generated, the vision of the operator tends to be obstructed and hindered such that the working process of the operation is affected. Accordingly, some pneumatic tools are equipped with exhaust devices, which are able to appropriately remove the debris and dust generated during the operation. Such known pneumatic tools are able to improve the drawback of operations being affected by debris or powder; however, the currently existing pneumatic tools can only provide the exhaust effect in one single direction, which is insufficient to satisfy the actual operation needs. In addition, it also known that the design of exhaust air to the front or to the rear is not optimal.

Taiwan Patent No. M513096 "Pneumatic Exhaust Device" discloses a device comprising an air guidance member secured onto the main body of a tool, an actuator mounted onto the air guidance member and an adjustment member connected to the actuator. By rotating the adjustment member clockwise or counterclockwise, the air guidance opening of the actuator can be overlapped with the slot of the air guidance member, or the air guidance opening of the actuator can be moved away from the slot of the air guidance member in order to allow the air to exhaust rearward or forward. Nevertheless, the overall tool component assembly and structure necessary for achieving the control of the exhaust direction in such device are complicated. In addition, the shielding portion configured to shield the rib separation area can only allow a portion of the blocked air to flow through such that some air exhaust still leaks to the front; therefore, such device cannot achieve the effect of closing the air channel effectively.

In view of the above, to achieve the objective, the inventor seeks to provide a reasonable design capable of effectively improving the aforementioned drawbacks after years of researches along with utilization of academic theories and principles.

SUMMARY OF THE INVENTION

A primary objective of the present invention is to provide a pneumatic tool with changeable exhaust direction, which is able to utilize a two-way movement or a rotational adjustment in order to achieve the function of easily controlling the air exhausted rearward or forward during the use of the tool.

To achieve the aforementioned objective, the present invention provides a pneumatic tool with changeable exhaust direction comprising a tool main body and a direction change assembly. The tool main body comprises a housing portion and a connector base; the housing portion includes a first exhaust channel formed thereon. The direction change assembly is attached onto the housing portion and the connector base. The direction change assembly comprises an air guidance member and an adjustment member. The air guidance member is secured onto one side of the housing portion, and one side of the air guidance member away from the housing portion includes a guiding member formed thereon. The adjustment member includes two ends formed as a second front edge and a second rear edge respectively. The adjustment member uses the second rear edge to mount onto one side of the air guidance member away from the housing portion and includes a second exhaust channel formed between the adjustment member and the air guidance member. The adjustment member includes a limiting portion formed at an outer circumferential wall and at a location corresponding to the guiding member, and the second rear end includes a sealing ring installed thereon. According to the above, wherein the adjustment member includes an axial movement relative to the air guidance member and along a first axis; the adjustment member generates the axial movement to allow the second rear edge to move away from the air guidance member in order to open the second exhaust channel, or the adjustment member generates the axial movement to allow the sealing member to abut against the air guidance member in order to close the second exhaust channel.

According to an embodiment of the present invention, wherein the adjustment member generates the axial movement to exert an external force on the adjustment member along the first axis.

According to an embodiment of the present invention, wherein the adjustment member generates the axial movement to rotate the adjustment member about the first axis.

According to an embodiment of the present invention, the pneumatic tool further comprises an elastic positioning member, an inner circumferential wall of the air guidance member includes a receiving hole formed thereon, an outer circumferential wall of the adjustment member includes a positioning portion formed at a location corresponding to the receiving hole, and two ends of the elastic positioning member abut against the receiving hole and the positioning portion respectively; in addition, the positioning portion comprises at least two positioning slots; one end of the elastic positioning member is inserted into one of the at least two positioning slots.

According to an embodiment of the present invention, wherein the air guidance member comprises a first front edge and a first rear edge; the air guidance member includes a shielding portion and a notch portion formed adjacent to the first front edge; the shielding portion is formed to circumference a portion of an outer circumferential wall of the adjustment member, and a gap is formed between the notch portion and the outer circumferential wall of the adjustment member.

According to an embodiment of the present invention, wherein an inner circumferential wall of the air guidance member includes a blocking portion formed to circumference thereon, the blocking portion is located between the first rear edge and the shielding portion, and the sealing ring abuts the blocking portion to close the second exhaust channel.

According to an embodiment of the present invention, wherein the shielding portion and the notch portion are respectively formed as two protrusions and two hemispherical depressions circumferencing the inner circumferential wall of the air guidance member and arranged to face toward each other; in addition, the two protrusions are arranged to face toward each other on a second axis, and the two hemispherical depressions are arranged to face toward each other on a third axis.

In comparison to the prior arts, the present invention is able to further achieve the following technical effects: the direction change assembly only requires the adjustment member to move relative to the air guidance member on a first axis by a predefined distance on the pneumatic tool such that the sealing ring is able to abut against the blocking portion in order to achieve an excellent airtight effect for closing the second exhaust channel; therefore, the rearward air exhaust can be prevented from producing flying dusts; alternatively, the second exhaust channel can be opened in order to allow the air to be exhausted in a particular direction forward such that debris generated can be blown away.

DETAILED DESCRIPTION OF THE INVENTION

Figure 1:
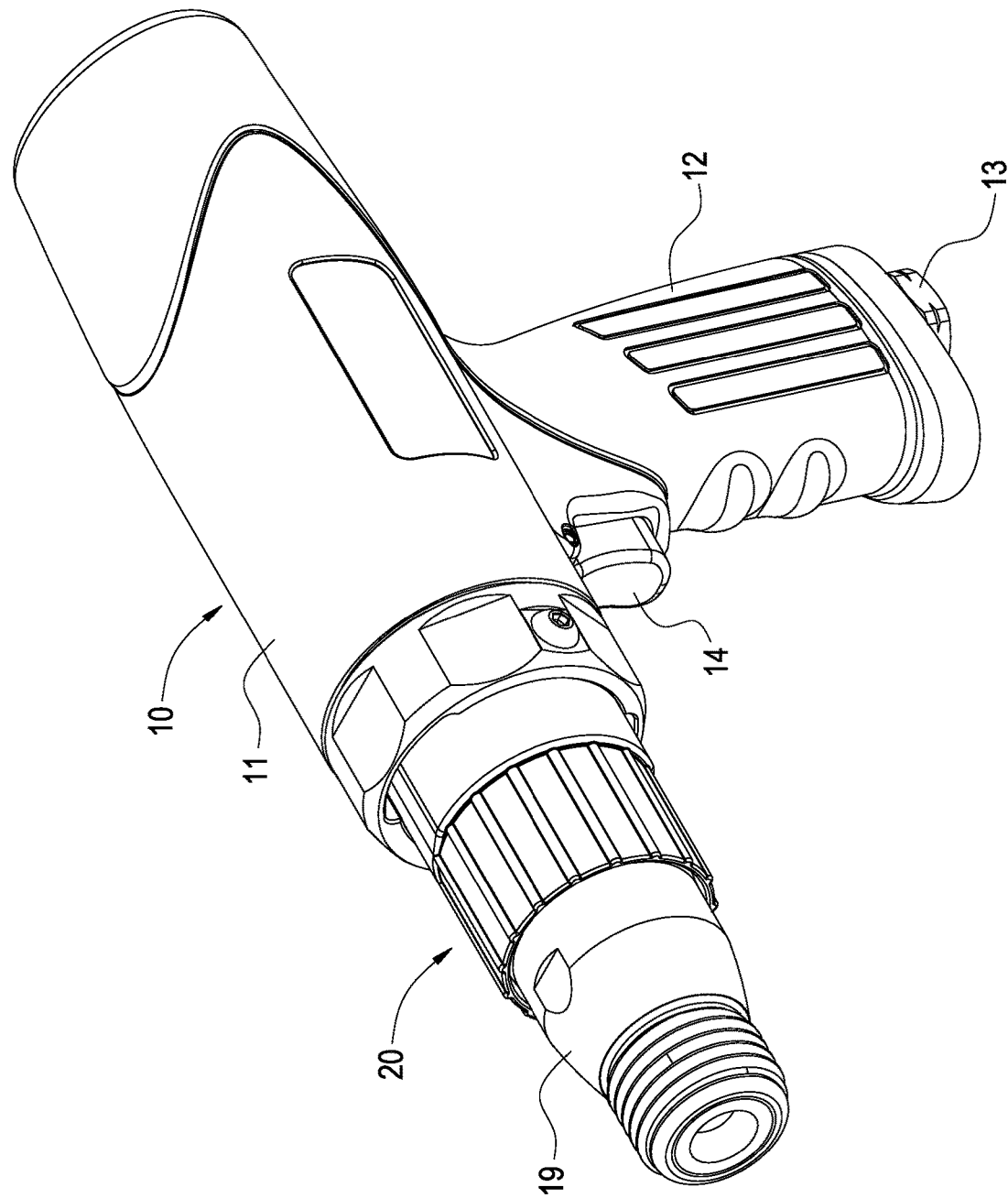
FIG. 1 is a perspective view of the pneumatic tool of the present invention.
Figure 2:
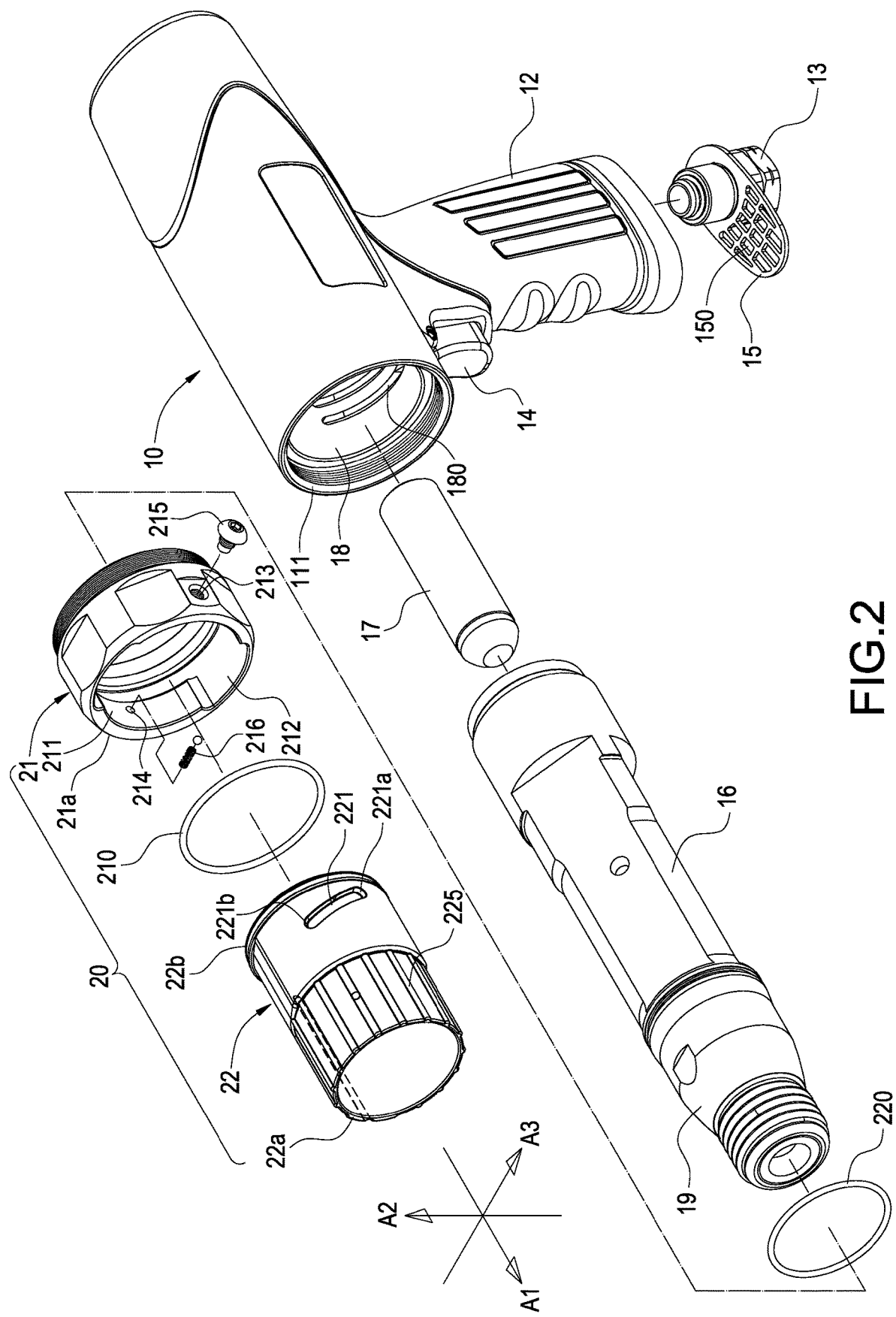
FIG. 2 is an exploded view of the pneumatic tool of the present invention.
Figure 3:
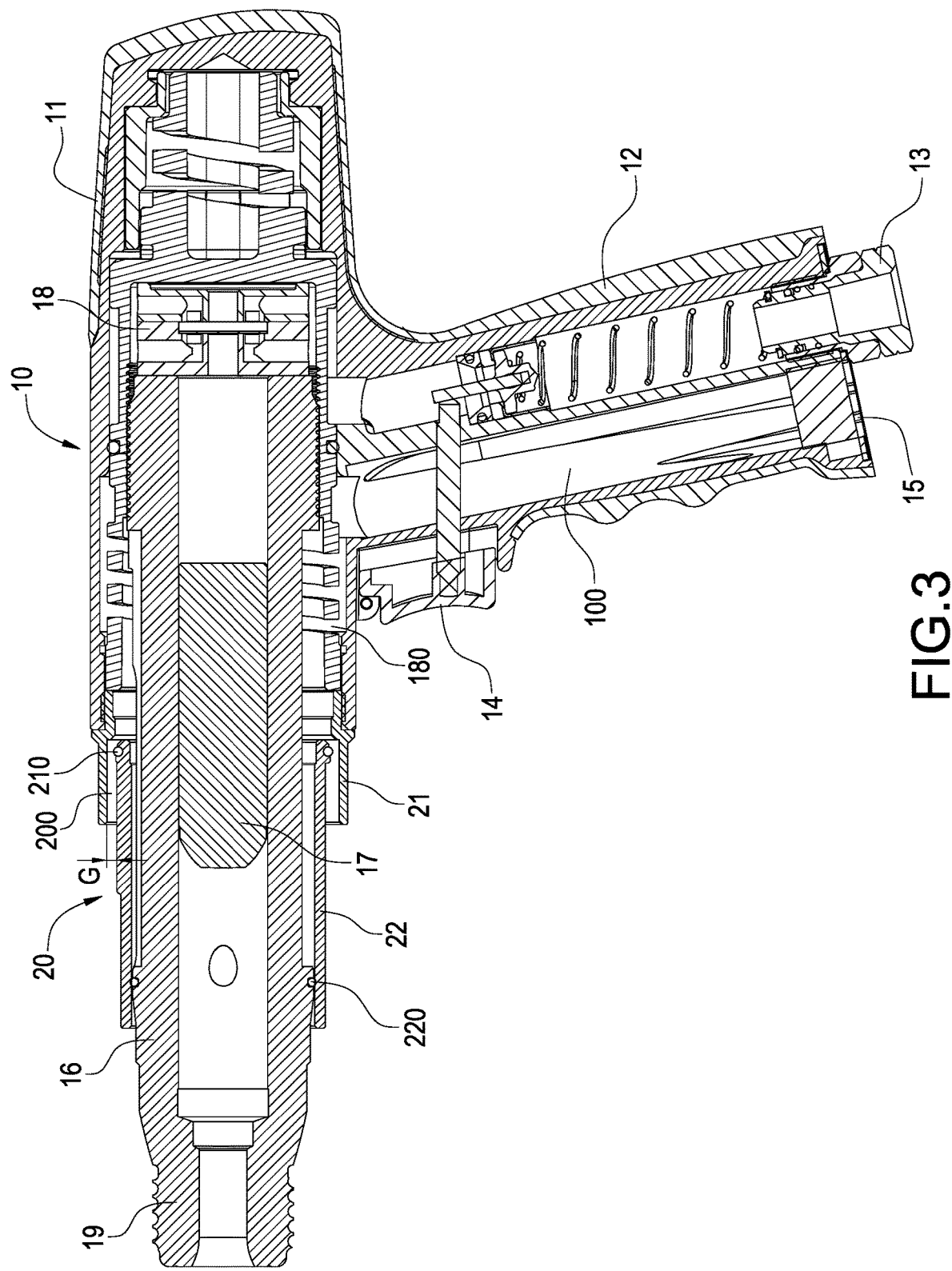
FIG. 3 is a lateral cross-sectional view of the pneumatic tool of the present invention during the forward air exhaust.
Figure 4:
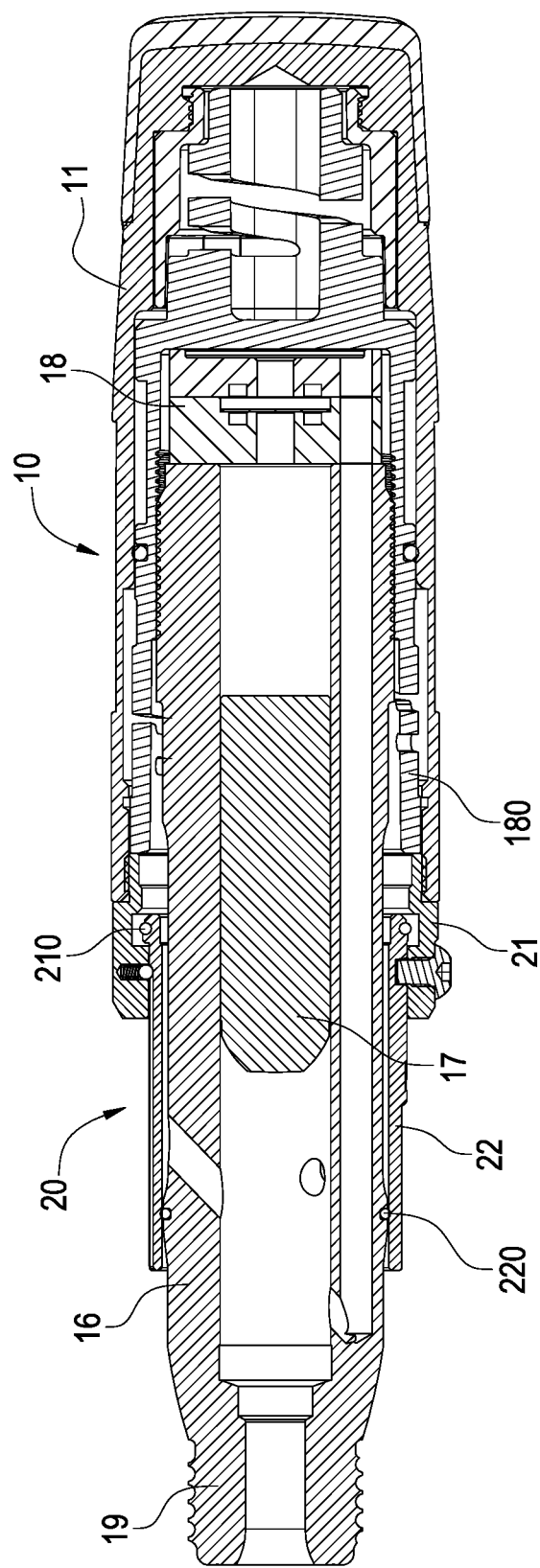
FIG. 4 is a top cross-sectional view of the pneumatic tool of the present invention during the forward air exhaust.
Figure 5:
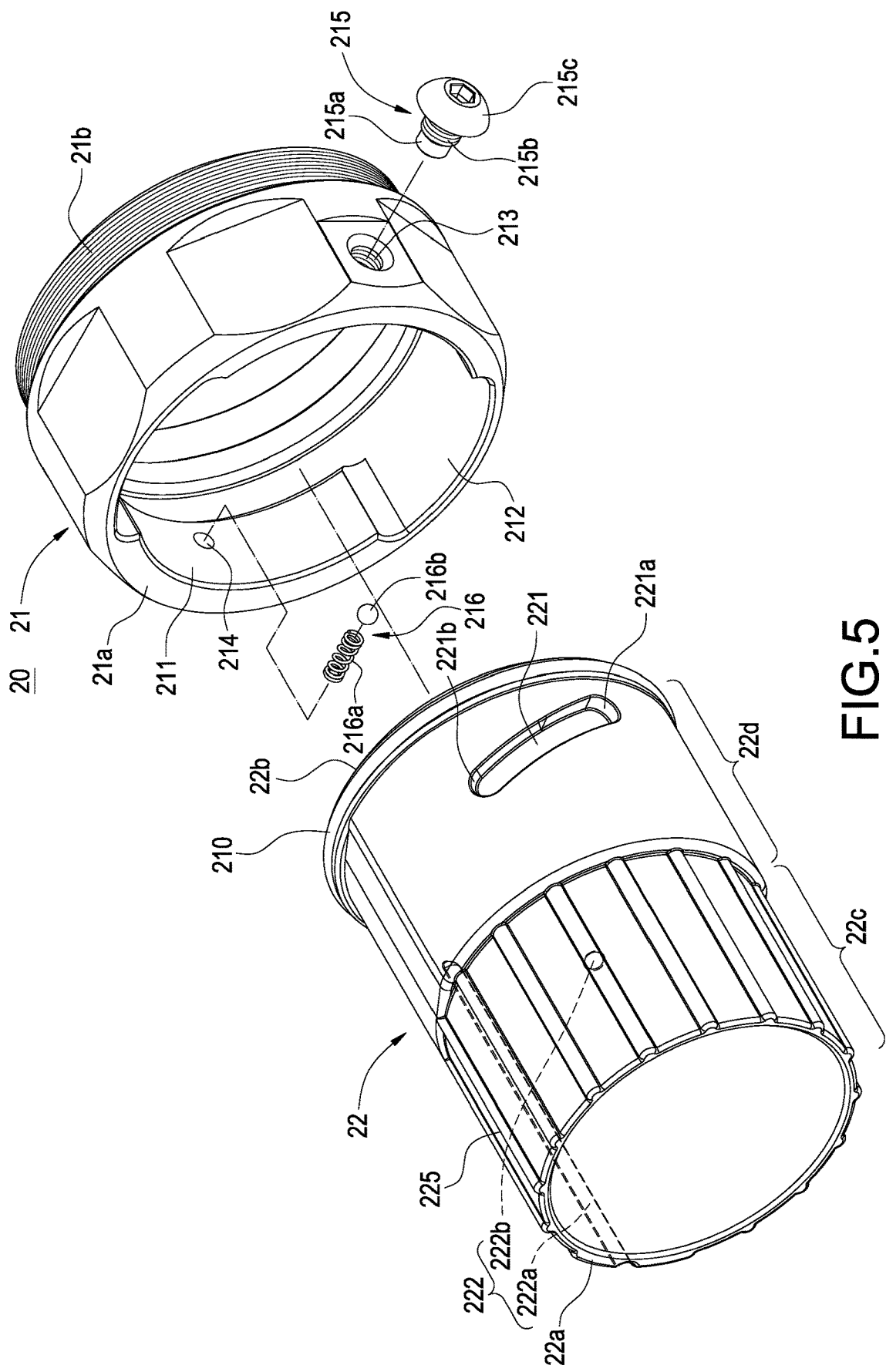
FIG. 5 is an exploded view of the direction change assembly of the present invention.
Figure 6:
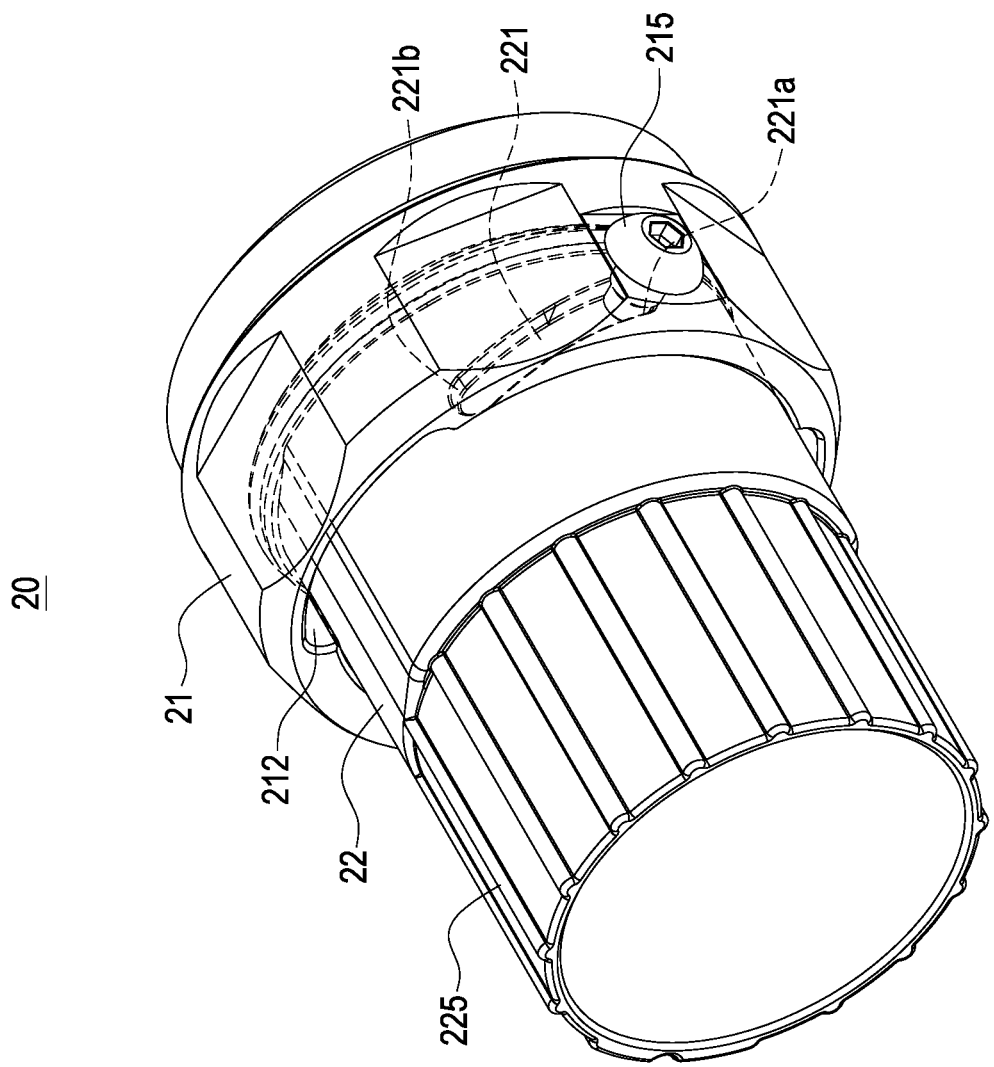
FIG. 6 is an assembly view of the direction change assembly of the present invention during the forward exhaust of air.
Figure 7:
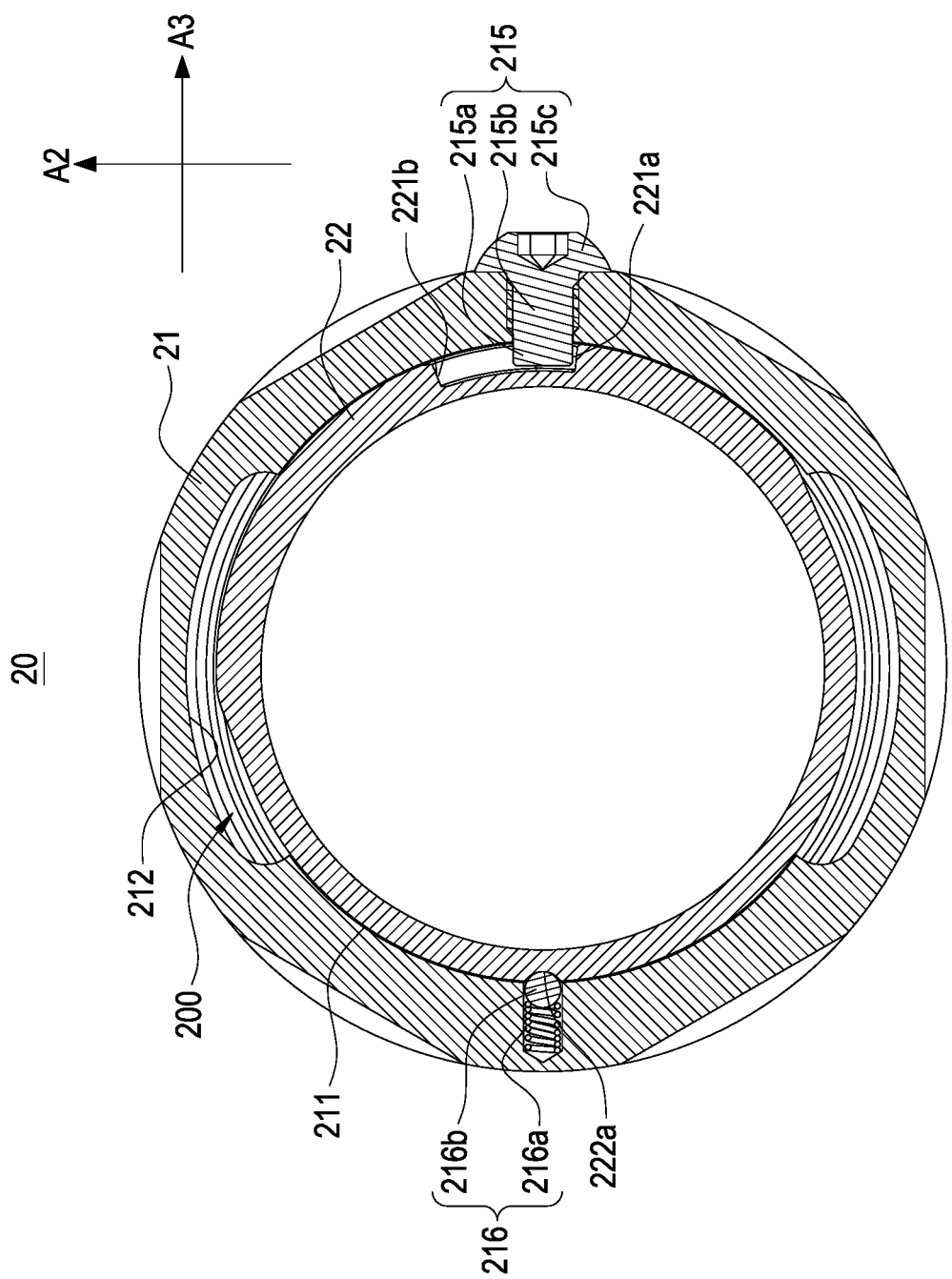
FIG. 7 is a front cross-sectional view of the direction change assembly of the present invention during the forward exhaust of air.
Figure 8:
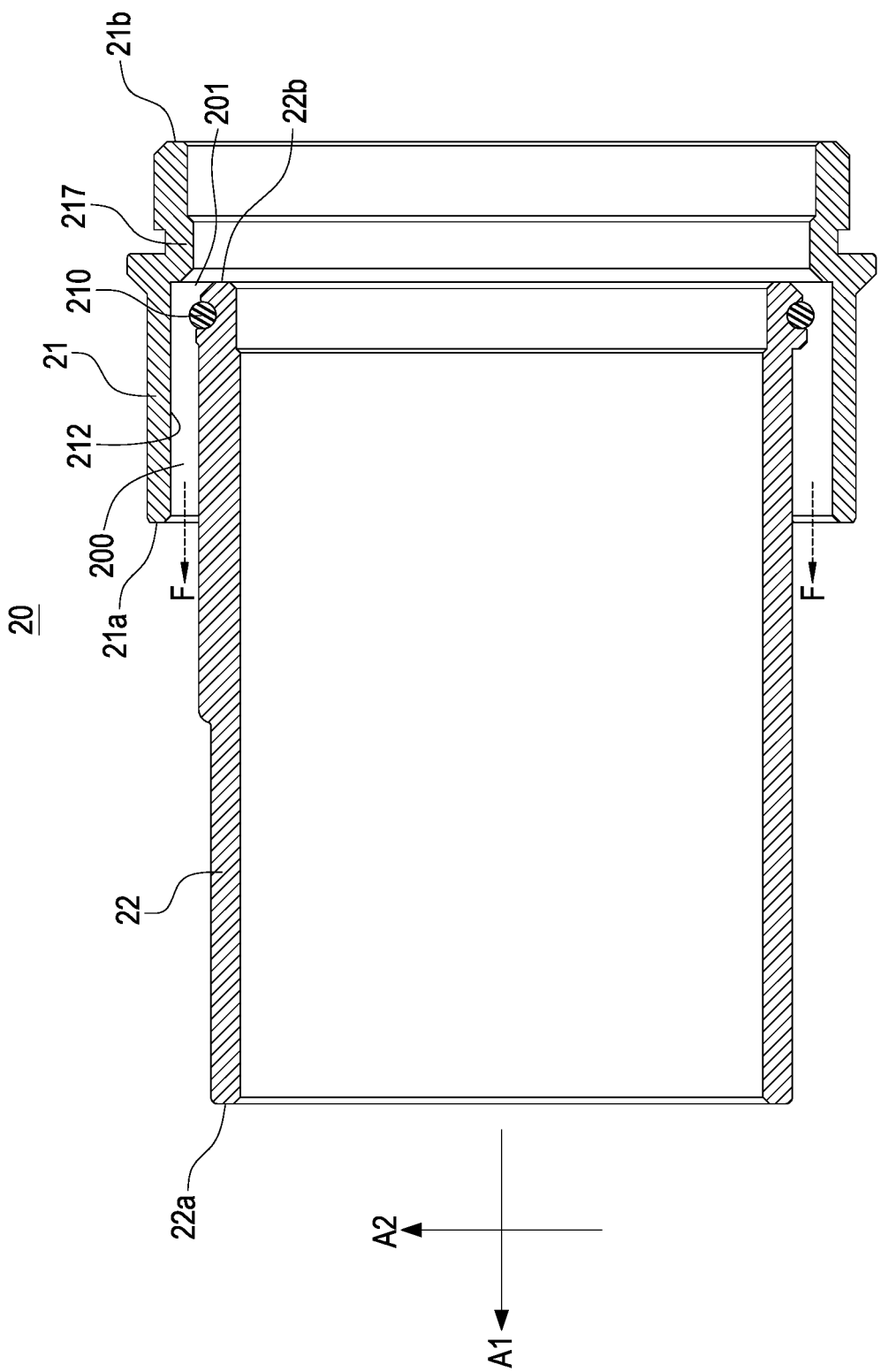
FIG. 8 is a lateral cross-sectional view of the direction change assembly of the present invention during the forward exhaust of air.
Figure 9:
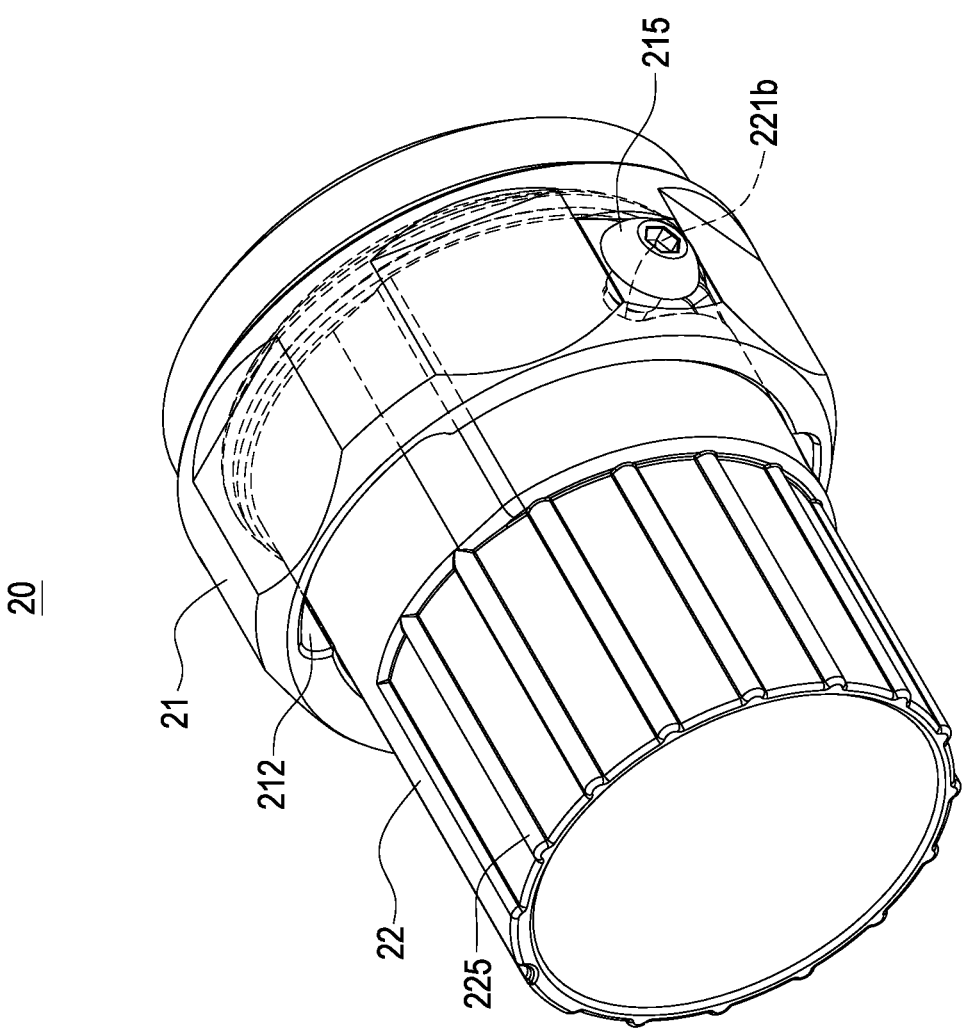
FIG. 9 is an assembly view of the direction change assembly of the present invention during the rearward exhaust of air.
Figure 10:
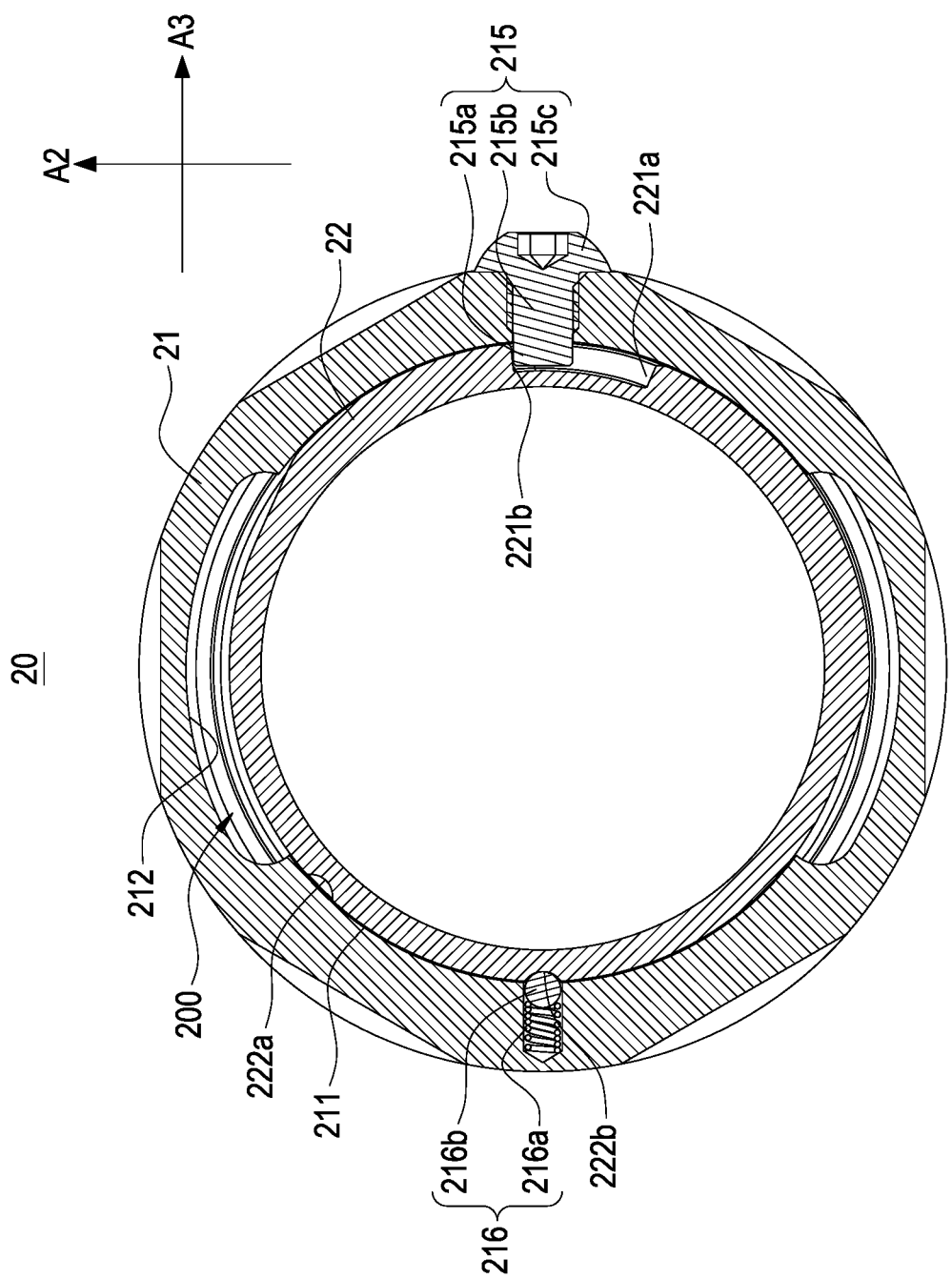
FIG. 10 is a front cross-sectional view of the direction change assembly of the present invention during the rearward exhaust of air.
Figure 11:
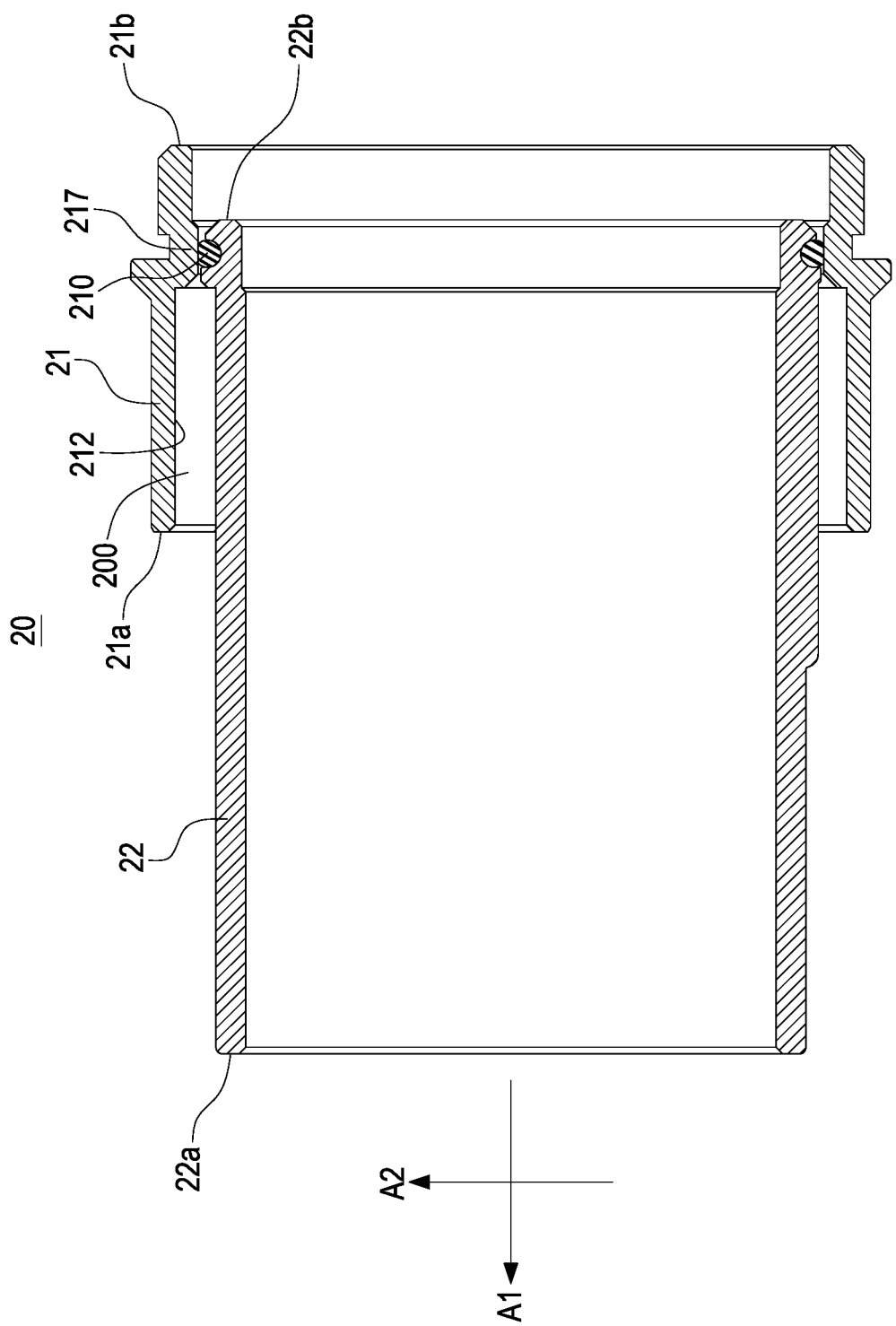
FIG. 11 is a lateral cross-sectional view of the direction change assembly of the present invention during the rearward exhaust of air.

The following provides a detailed description on the technical content of the present invention along with the accompanied drawings. However, it shall be understood that the drawings are provided for illustration purposes only rather than to limit the scope of the present invention.

Please refer to FIGS. 1 to 4, it can be understood that a first axis A1, a second axis A2 and a third axis A3 perpendicular to the first axis A1 shown in the drawings represent spatial coordinates, which can be used as the references for the technical description and the relative spatial locations of elements of the present invention described hereafter; therefore, they shall not be treated as limitations of the present invention. The present invention provides a pneumatic tool with changeable exhaust direction, comprising a tool main body 10 and a direction change assembly 20. In addition, the tool main body 10 comprises a housing portion 11 formed of a hollow receiving space along the first axis A1, a grip portion 12 extended from the housing portion 11 toward a direction adjacent to the parallel second axis A2, an intake end 13 arranged at the bottom side of the grip portion 12 and connected to the air intake (not given a number), a trigger portion 14 for driving the air intake, a channel cover plate 15, which is connected to a first exhaust channel 100, installed at the bottom side of the grip portion 12 as well as a cylinder 16, a piston 17 and a pneumatic valve seat 18 arranged inside the hollow receiving space of the housing 11 and a connector base 19 attached to one end of the cylinder 16; wherein the pneumatic valve seat 18 includes at least one channel opening 180 connected to the first exhaust channel 100. Furthermore, the air inside the housing portion 11 can be exhausted to the external via the first exhaust channel 100 and passing through a plurality of openings 150 of the channel cover plate 15.

Please refer together to FIG. 5 to FIG. 8, the direction change assembly 20 is installed between the housing portion 11 and the connector base 19. In addition, the direction change assembly 20 comprises an air guidance member 21 and an adjustment member 22, used for adjusting the air inside the housing portion 11 to be exhausted to the external toward the direction of the connector base 19. The following provides a detailed description of the component assembly of the direction change adjustment exhaust assembly 20 and the operation method of the direction change of the exhaust.

The air guidance member 21 can be a member similar to a screw nut structure. The air guidance member includes a first front edge 21a and a first rear edge 21b, and an outer circumferential wall of the air guidance member 21 adjacent to the first rear edge 21b is formed of threads thereon in order to allow the air guidance member 21 to be fastened onto an opening side 111 of the housing portion 11 via a wrench. In addition, the inner circumferential wall of the air guidance member 21 at the first front edge 21a includes a shielding portion 211 and a notch portion 212 indented inward and arranged opposite from the shielding portion 211. The shielding portion 211 abuts against the outer circumferential wall of the adjustment member 22, and a gap G is formed between the notch portion 212 and the adjustment member 22. The distance of the gap G refers to the cross sectional size (the cross sectional size taken along the second axis A2) at the opening area of the second exhaust channel 200 connected to the external; the size of the gap G can affect the flow rate of the exhaust and it is not limited to any dimensions but can be designed according to the actual conditions. In this embodiment, the shielding portion 211 refers to two protrusions arranged corresponding to each other and formed along the inner circumferential profile of the air guidance member 21, and the notch portion 212 refers to two hemispherical depressions formed opposite from the two protruding portions. In addition, the two protrusions are arranged correspondingly on the third axis A3, and the two hemispherical depressions are arranged correspondingly on the second axis A2; however, it can be understood that the present invention is not limited to such quantity and the relative location or configuration relationship such that this embodiment is only an exemplary embodiment of the present invention. Moreover, present invention can also include three or more than three of protrusions and hemispherical depressions of the shielding portion 211 and the notch portion 212 respectively in order to form multiple-exhaust channels.

According to the above, the air guidance member 21 includes a through hole 213 formed at the circumferential wall between the first front edge 21a and the first rear edge 21b and penetrating through the surface of the shielding portion 211 in order to allow a guiding member 215 to penetrate into the through hole 213. In addition, the guiding member 215 comprises an abutment end 215a, a threaded portion 215b and a fastening end 215c. The guiding member 215 is able to be engaged inside the through hole via the threaded portion 215b by using a hand tool to exert a force on the fastening end 215c, and the abutment end 215a protrudes out of the surface of the shielding portion 211.

According to the above, the air guidance member 21 includes a receiving hole 214 formed at the surface of the shielding portion 211 and an elastic positioning member 216 inserted into the receiving hole 214. In addition, the elastic positioning member 216 comprises a compression spring 216a and a roller 216b inserted into the compression spring 216a. Furthermore, one end of the compression spring 216a elastically abuts against the bottom wall of the receiving hole 214 in order to limit the movement of the roller 216b. Moreover, the inner circumferential wall of the air guidance member 21 adjacent to the second rear edge 22b includes a blocking portion 217, and the blocking portion 217 forms a protrusion to surround a portion of the inner circumferential wall of the air guidance member 21. The blocking portion 217 can be of the smallest inner diameter of the air guidance member 21; however, the present invention is not limited to such size only, which is only illustrated as an exemplary embodiment of the present invention.

The adjustment member 22 is mounted onto one side of the air guidance member 21 away from the housing portion 11, and a second exhaust channel 200 is formed between the adjustment member 22 and the air guidance member 21. The adjustment member 22 includes a second front edge 22a and a second rear edge 22b. A front end portion 22c and a rear end portion 22d are defined between the second front edge 22a and the second rear edge 22b. The adjustment member 22 mounted onto the air guidance member 21 uses a sealing ring 210 mounted onto the second rear edge 22b in order to be inserted into the shielding portion 211 of the air guidance member 21 via the first front edge 21a. Moreover, one side of the connector base 19 is mounted with another sealing ring 220 in order to allow adjustment of the second front edge 22a of the adjustment member 22 to be secured onto the outer circumference of the connector base 19.

According to the above, the outer circumferential wall of the adjustment member 22 at the rear end portion 22d includes a limiting portion 221 and a positioning portion 222 formed thereon respectively. One end of the aforementioned guiding member 215 is inserted into the limiting portion 221, and the limiting portion 221 comprises a first limiting end 221a and a second limiting end 221b. The guiding member 215 performs limited movements between the first limiting end 221a and the second limiting end 221b. In addition, the positioning portion 222 comprises a first positioning slot 222a and a second positioning slot 222b. The roller 216b of the elastic positioning member 216 is inserted into one of the first positioning slot 222a and the second positioning slot 222b. Furthermore, the cross sectional profiles of the first positioning slot 222a and the second positioning slot 222b match with the outer circumferential profile of the roller 216b and are of similar sizes.

According to the above, the outer circumferential wall of the adjustment member 22 at the front end portion 22c further includes a plurality of protruding ribs 225. Each one of the plurality of protruding ribs 225 is arranged parallel to the first axis A1 in order to form a rough surface facilitating the user to apply forces to rotate the adjustment member 22. The first positioning slot 222a or the second positioning slot 222b can be an elongated slot configuration matching with the outer circumferential profile of the roller 216 and along the first axis A1, or it can be of a depression having dimension similar to the size of the roller. Although the drawings show that the first positioning slot 222a is of an elongated slot configuration and the second positioning slot 222b is of a hemispherical depression; however, the present invention is not limited to such configurations only.

According to the above, the first limiting end 221a and the second limiting end 221b of the limiting portion 221 are of a coordinate difference (not shown in the figures) on the first axis A1, meaning that the axial distance between the first limiting end 221a and the second rear edge 22b on the first axis A1 is not equivalent to the axial distance between the second limiting tend 221b and the second rear edge 22b on the first axis A1. The drawing shows that the axial distance between the first limiting end 221a and the second rear edge 22b on the first axis A1 is smaller than the axial distance between the second limiting end 221b and the second rear edge 22b on the first axis A1; however, the present invention is not limited to such configuration only. In addition, if the first positioning slot 222a and the second positioning slot 222b are designed to be of the hemispherical depression configuration, then the first positioning slot 222a and the second positioning slot 222b are of the same coordinate difference (not shown in the figures) on the first axis A1 as previously mentioned.

According to the above, the user can rotate the adjustment member 22 by a certain rotational angle in order to allow the guiding member 215 to move inside the limiting portion 221. In addition, during the rotational process, the roller 216b is able to rotate at the outer circumferential wall of the adjustment member 22 under the compressive elasticity of the compression spring 216a, and it is able to allow the adjustment member 22 to move relative to the air guidance member 21 along the first axis A1 in order to open or close the second exhaust channel 200.

Please refer to FIG. 3 and FIGS. 6 to 8. When the user wishes to allow the air inside the pneumatic tool to exhaust toward the direction of the connector base 19, before the operation of the pneumatic tool, the user can rotate the adjustment member 22 in a clockwise direction as viewed from the distal end and cause the adjustment member 22 to translate along the first axis A1 from the connector base 19 to the housing portion 11. During this time, the adjustment member 22 generates an axial movement relative to the air guidance member 21 along the first axis A1 and away from the first rear edge 21b until the abutment end 215a of the guiding member 215 reaches the first limiting end 221a to allow the roller 216b of the elastic positioning member 216 to be inserted into the first positioning slot 222a for positioning thereof. In addition, a through opening 201 is generated between the second exhaust channel 200 and the air guidance member 21 in order to connect to the internal of the housing portion 11. At this time, during the pneumatic operation, the internal air is able to be exhausted from the through opening 201 and the second exhaust channel 200, and the exhaust air flow is exhausted along the outer circumferential wall of the adjustment member 22 toward the direction of the working piece in order to achieve the objective of forward exhaust at the front end.

Please refer to FIG. 2 and FIGS. 9 to 11. When the user wishes to exhaust the air inside the pneumatic tool toward the direction of the grip portion 12, before the operation of the pneumatic tool, the user can rotate the adjustment member 22 in a clockwise direction as viewed from the distal end and cause the adjustment member 22 to translate along the first axis A1 from the housing portion 11 to the connector base 19. During this time, the adjustment member 22 generates an axial movement relative to the air guidance member 21 along the first axis A1 and toward the first rear edge 21b until the abutment end 215a of the guiding member 215 reaches the second limiting end 221b to allow the roller 216b of the elastic positioning member 216 to be inserted into the second positioning slot 222b for positioning thereof. In addition, the sealing ring 210 mounted at the second rear edge abuts against the circumferential wall surface of the blocking portion 217 in order to seal the connecting passage between the second exhaust channel 200 and the internal cavity of the air guidance member 21 such that the path of the internal air flowing into the second exhaust channel 200 is blocked. Consequently, the internal air is exhausted toward the direction of the first exhaust channel 100 via the channel opening 180 of the valve seat 18 to the external in order to achieve the objective of rearward exhaust at the rear end.

Figure 12:
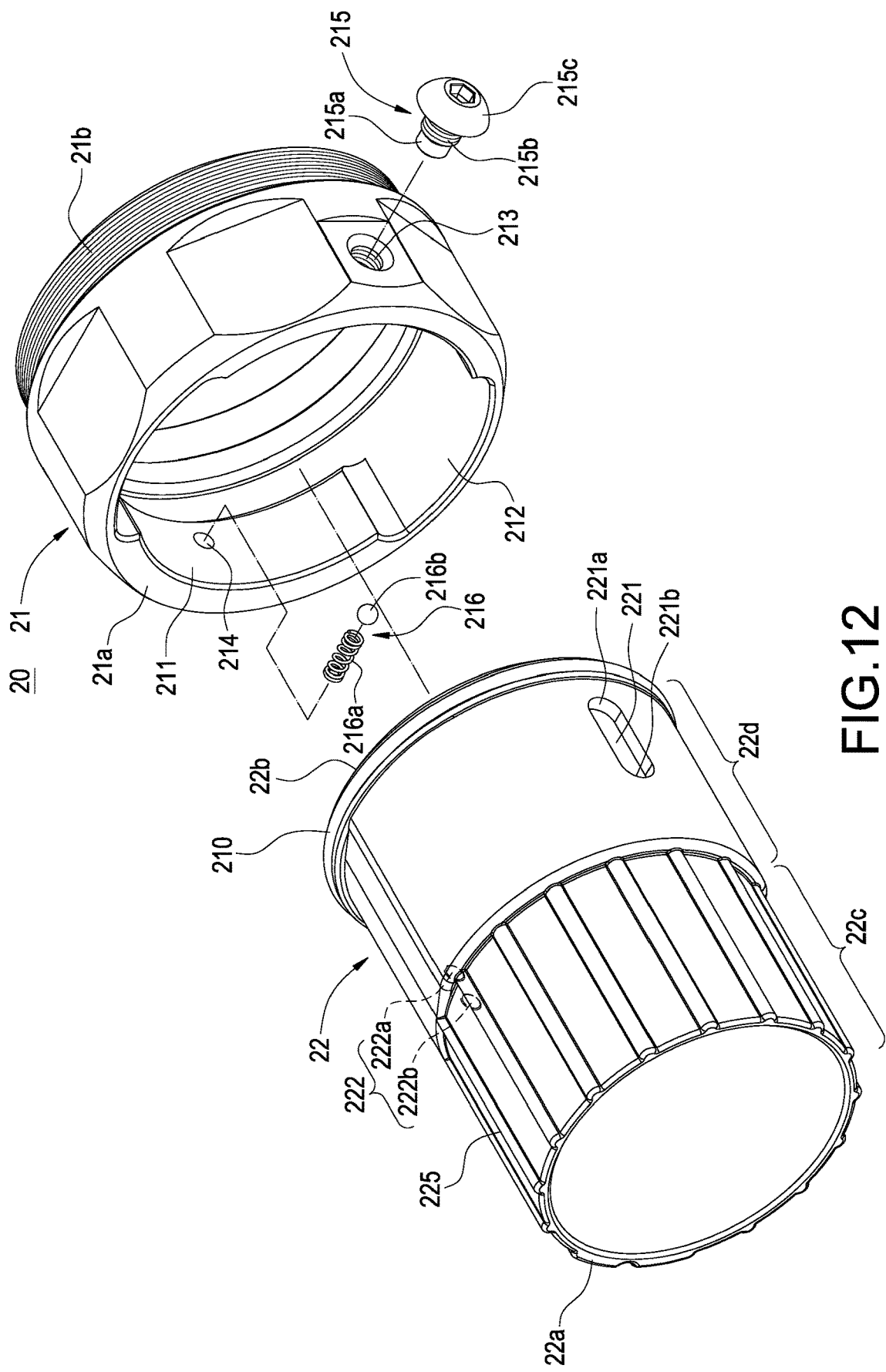
FIG. 12 is an exploded view of another embodiment of the direction change assembly of the present invention.
Figure 13:
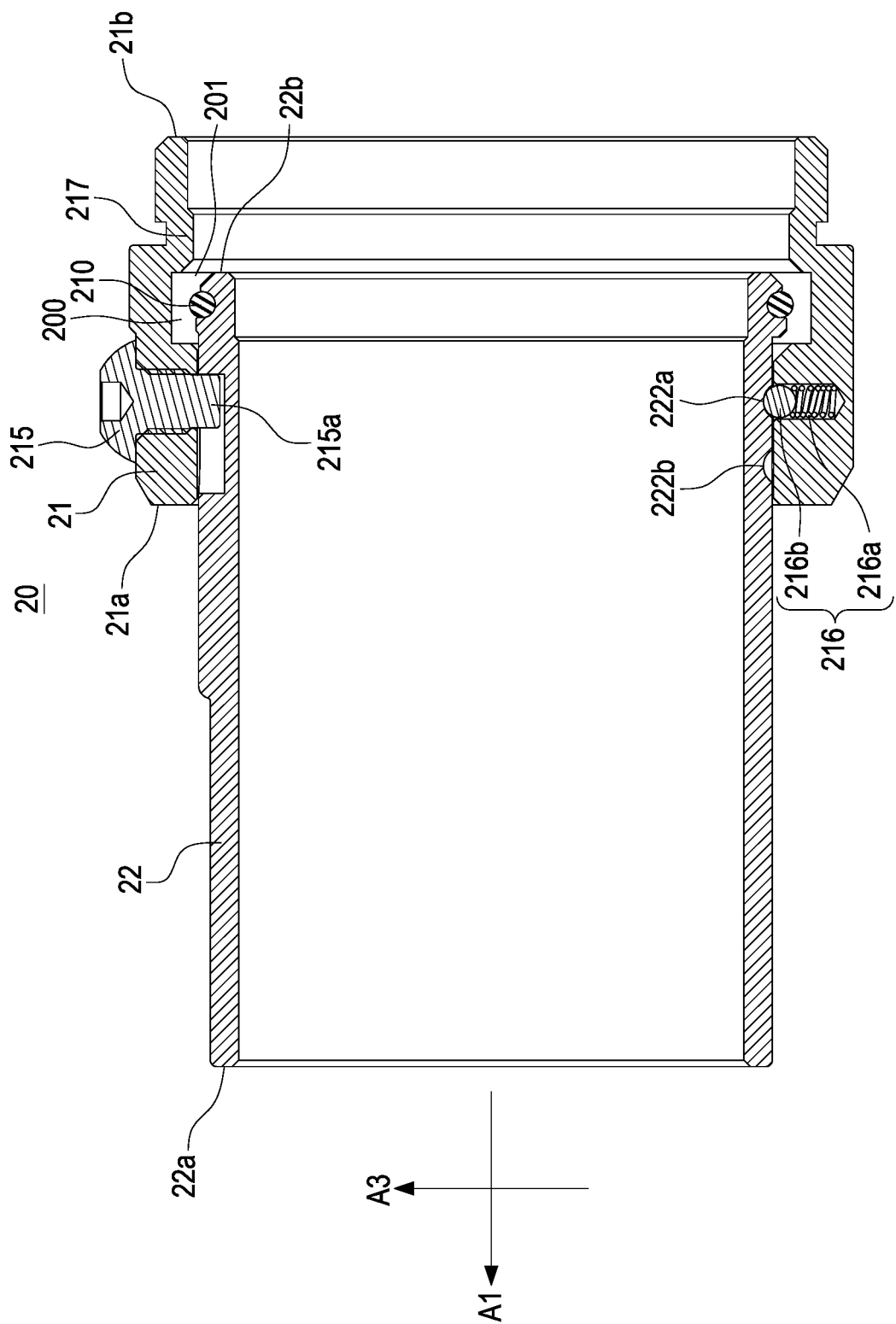
FIG. 13 is a lateral cross-sectional view of another embodiment of direction change assembly of the present invention during the forward exhaust of air.
Figure 14:
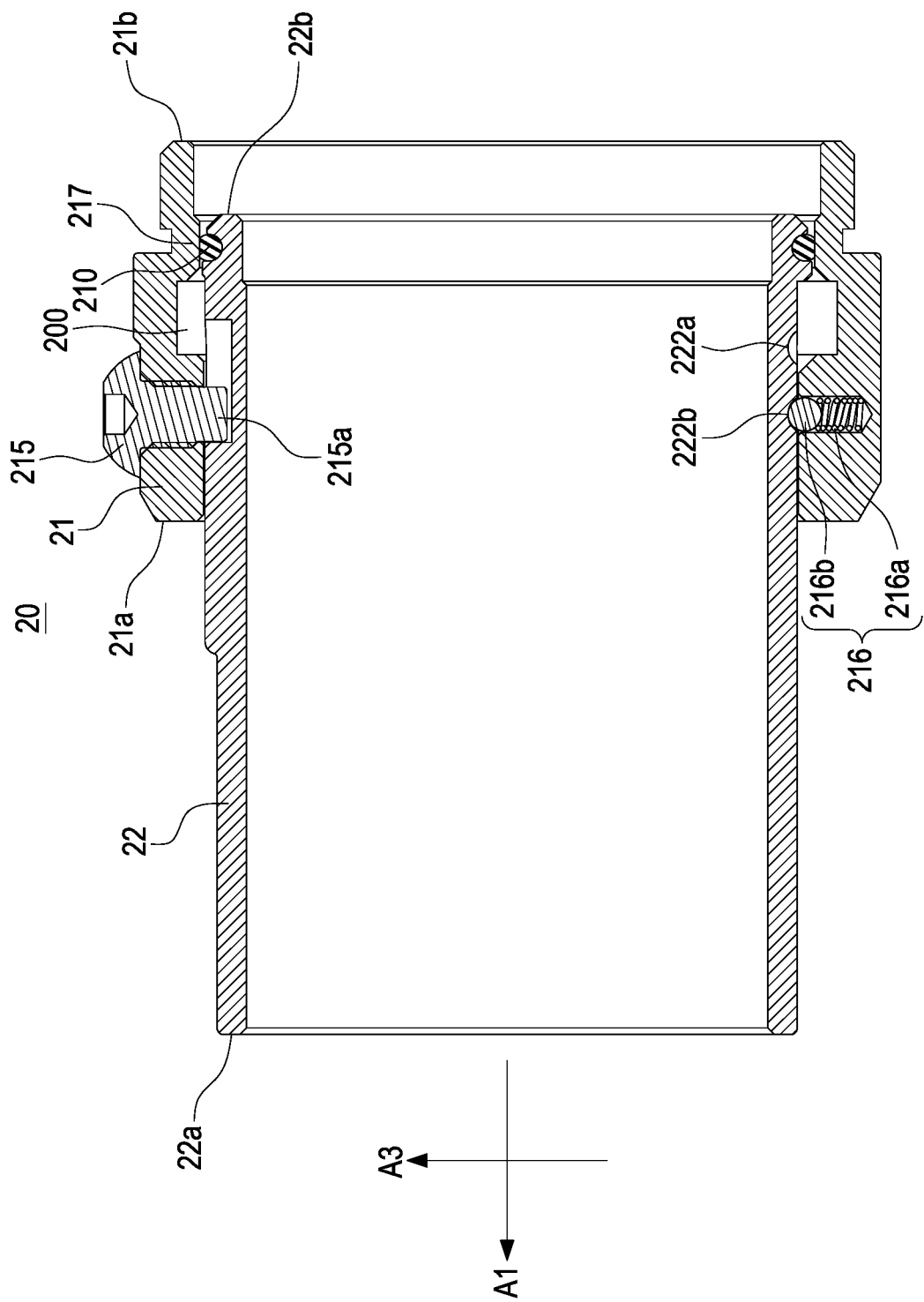
FIG. 14 is a lateral cross-sectional view of another embodiment of the direction change assembly of the present invention during the rearward exhaust of air.

As shown in FIG. 12, the present invention further provides another embodiment of the pneumatic tool with changeable exhaust direction. The following describes the differences between the present embodiment and the previous embodiment; however, the similar parts of the two are omitted without repetitive descriptions. In this embodiment, the main difference relies in the limiting portion 221 and the positioning portion 222 of the adjustment member 22. The limiting portion 221 is modified into a linear slot formed along a first axis A1, meaning that the coordinate difference between the first limiting end 221a and the second limiting end 221b of the limiting portion 221 on the first axis A1 is increased. Furthermore, the positioning portion 222 is modified into at least two hemispherical depressions arranged along the first axis A1, meaning the center locations of the first positioning slot 222a and the second positioning slot 222b are located on the first axis A1, and the coordinate difference of the two on the first axis A1 is equivalent to the coordinate difference between the first limiting end 221a and the second limiting end 221b on the first axis A1; however, the present invention is not limited to such configuration only, and it can also be a coordinate difference smaller than the coordinate difference between the first limiting end 221a and the second limiting end 221b on the first axis A1.

Please refer to FIG. 3 and FIGS. 12 to 14. When the user wishes to allow the air inside the pneumatic tool to exhaust toward the direction of the connector base 19, before the operation of the pneumatic tool, the user can apply an external force on the adjustment member 22 along the first axis A1 and toward the direction of the connector base 19. During the same time, the adjustment member 22 then generates an axial movement relative to the air guidance member 21 along the first axis A1 and in a direction away from the first rear edge 21b until the abutment end 215a of the guiding member 215 reaches the first limiting end 221a to allow the roller 216b of the elastic positioning member 216 to be inserted into the first positioning slot 222a for positioning thereof. In addition, a through opening 201 is generated between the air guidance member 21 and the adjustment member 22 to allow passage of air between the internal cavity of the housing portion 11 to the second exhaust channel 200. At this time, during the pneumatic operation, the internal air is able to be exhausted from the through opening 201 and the second exhaust channel 200 in order to achieve the objective of forward exhaust at the front end. On the other hand, when the user wishes to exhaust the air inside the pneumatic tool toward the direction of the grip portion 12, the user can apply an external force on the adjustment member 22 along the first axis A1 and in a direction away from the connector base 19. During the same time, the adjustment member 22 then generates an axial movement relative to the air guidance member 21 along the first axis A1 and in a direction toward the first rear edge 21b in order to allow the abutment end 215a of the guiding member 215 to reach the second limiting end 221b and to allow the roller 216b of the elastic positioning member 216 to be inserted into the second positioning slot 222b for positioning thereof. In addition, the sealing ring 210 mounted at the second rear edge abuts against the circumferential wall surface of the blocking portion 217 in order to seal the connecting passage between the second exhaust channel 200 and the internal of the air guidance member 21 such that the objective of rearward exhaust at the rear end is achieved.

In addition to the above, for the pneumatic tool with changeable exhaust direction of the present invention, to facilitate the use of the function for changing the exhaust direction by the user, the outer circumferential wall surface of the rear end portion 22d of the adjustment member 22 can be provided with labels indicating the corresponding exhaust directions. In the drawings, the symbols of R, F and two-way arrows are used to indicate the direction of movement or direction of rotation for rearward exhaust and forward exhaust; however, the present invention is not limited to such configuration only, and this is only provided as an exemplary embodiment of the present invention. Accordingly, the user is able to make simple rotational adjustments in order to exhaust the air rearward to prevent flying of dust during the use of the device or to exhaust the air forward to blow away debris generated during processing operations.

In view of the above, the pneumatic tool with changeable exhaust direction of the present invention is able to achieve the expected objectives and overcome the drawbacks of known arts, which is of novelty and inventive step to comply with the patentability for patents. The present invention is, therefore, applied in accordance with the Patent Act in light of the grant of the patent right and the protection of the interest of the inventor.

What is claimed is:
1. A pneumatic tool having a direction change assembly for changing an exhaust direction, comprising:
a tool main body comprising a housing portion and a connector base; the housing portion having a first exhaust channel formed thereon;
a direction change assembly attached onto the housing portion and the connector base; the direction change assembly comprising:
an air guidance member secured onto one side of the housing portion, and one side of the air guidance member away from the housing portion having a guiding member formed thereon; and an adjustment member having two ends formed as a front edge and a rear edge respectively; the rear edge of the adjustment member mounted to the one side of the air guidance member away from the housing portion, wherein a second exhaust channel is formed between the adjustment member and the air guidance member; the adjustment member having a limiting portion formed at an outer circumferential wall of the adjustment member and at a location corresponding to the guiding member, and the rear edge having a sealing ring installed thereon; and wherein the adjustment member is configured to move relative to the air guidance member along a first axis, and the movement of the adjustment member along the first axis moves the rear edge away from the air guidance member in order to open the second exhaust channel or the movement of the adjustment member along the first axis moves the rear edge toward the air guidance member to allow the sealing ring to abut against the air guidance member in order to close the second exhaust channel.

2. The pneumatic tool according to claim 1, wherein the movement of the adjustment member is in response to the exertion of an external force on the adjustment member in a direction transverse to the first axis.

3. The pneumatic tool according to claim 1, wherein the movement of the adjustment member is in response to rotation of the adjustment member about the first axis.

4. The pneumatic tool according to claim 1, further comprising an elastic positioning member, wherein an inner circumferential wall of the air guidance member includes a receiving hole formed thereon, the outer circumferential wall of the adjustment member includes a positioning portion formed at a location corresponding to the receiving hole, and two ends of the elastic positioning member abut against the receiving hole and the positioning portion respectively.

5. The pneumatic tool according to claim 4, wherein the positioning portion comprises at least two positioning slots; one end of the elastic positioning member is inserted into one of the at least two positioning slots.

6. The pneumatic tool according to claim 5, wherein the elastic positioning member comprises a compression spring and a roller connected to the compression spring; outer circumferential profiles of the at least two positioning slots match with a profile of the roller in order to allow the roller to be partially inserted into one of the at least two positioning slots.

7. The pneumatic tool according to claim 1, wherein the limiting portion is a slot and includes a first limiting end and a second limiting end; the axial movement comprises positioning the guiding member at the first limiting end, the second limiting end or between the first and the second limiting ends.

8. The pneumatic tool according to claim 1, wherein the air guidance member comprises a first front edge and a first rear edge; the air guidance member includes a shielding portion and a notch portion formed adjacent to the first front edge; the shielding portion is formed to encircle a portion of the outer circumferential wall of the adjustment member, and a gap is formed between the notch portion and the outer circumferential wall of the adjustment member.

9. The pneumatic tool according to claim 8, wherein an inner circumferential wall of the air guidance member includes a blocking portion formed thereon, the blocking portion is located between the first rear edge and the shielding portion, and the sealing ring abuts against the air guidance member in order to close the second exhaust channel by abutting against the blocking portion.

10. The pneumatic tool according to claim 8, wherein the shielding portion and the notch portion are respectively formed as two protrusions and two hemispherical depressions on the circumference of an inner circumferential wall of the air guidance member and arranged to face toward each other.

11. The pneumatic tool according to claim 10, wherein the two protrusions are arranged to face toward each other on a second axis, and the two hemispherical depressions are arranged to face toward each other on a third axis.

12. The pneumatic tool according to claim 1, wherein two ends of the limiting portion are formed as a first limiting end and a second limiting end respectively; the first limiting end and the second limiting end are at different coordinates on the first axis.

* * * * *